US007695004B2

(12) United States Patent
Inoue

(10) Patent No.: US 7,695,004 B2
(45) Date of Patent: Apr. 13, 2010

(54) AIRBAG APPARATUS

(75) Inventor: Michio Inoue, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 290 days.

(21) Appl. No.: 11/802,280

(22) Filed: May 22, 2007

(65) Prior Publication Data

US 2007/0273129 A1 Nov. 29, 2007

(30) Foreign Application Priority Data

May 26, 2006 (JP) ............................ 2006-146894

(51) Int. Cl.
*B60R 21/16* (2006.01)

(52) U.S. Cl. .................................................. 280/730.2

(58) Field of Classification Search .............. 280/728.2, 280/730.2, 743.1; 297/216.13
See application file for complete search history.

(56) References Cited

U.S. PATENT DOCUMENTS 6,206,466 B1 * 3/2001 Komatsu ............... 297/216.13
6,213,498 B1 * 4/2001 Ghalambor et al. ...... 280/730.2
6,352,304 B1 * 3/2002 Sorgenfrei ............. 297/216.13
6,450,528 B1 * 9/2002 Suezawa et al. .......... 280/730.2
2005/0156412 A1 * 7/2005 Panagos et al. .......... 280/730.2

FOREIGN PATENT DOCUMENTS

JP A-10-024793 1/1998
JP 10081187 A * 3/1998
JP A-10-080590 3/1998
JP A-10-081187 3/1998

* cited by examiner

*Primary Examiner*—Paul N Dickson
*Assistant Examiner*—Robert A Coker
(74) *Attorney, Agent, or Firm*—Posz Law Group, PLC

(57) ABSTRACT

An airbag apparatus comprising an airbag module installed in a backrest of a vehicle seat is provided. The backrest has a side support on each side. Each side support has a base portion located at a position closer to a center of the backrest. The airbag module is installed in a side portion of the back rest that faces the exterior of the vehicle. The airbag module includes a gas generator that generates gas in response to impact from a side of the vehicle, and first and second airbag portions that are inflated and deployed by the gas generated by the gas generator. The airbag module is installed in the backrest in such a manner that, when the airbag is inflated and deployed, the first airbag portion pushes the base portion of the side support on the exterior side obliquely forward and further into the passenger compartment.

7 Claims, 8 Drawing Sheets

AIRBAG APPARATUS

BACKGROUND OF THE INVENTION

The present invention relates to an airbag apparatus for reducing impacts from a side of a vehicle.

Japanese Laid-Open Patent Publication Nos. 10-24793, 10-80590, and 10-81187 each disclose an airbag apparatus that protect an occupant of a vehicle when the impact is applied from a side of the vehicle. An airbag module of such an airbag apparatus is provided in an exterior side of a backrest of a vehicle seat. The airbag module includes an inflator, which generates gas in response to impact, and an airbag, which is inflated and deployed by the gas discharged from the inflator.

When impact is applied from a body side portion of a vehicle toward the passenger compartment, the inflator of the above airbag apparatus supplies gas into the airbag, so that the airbag is inflated and deployed forward with respect to the backrest. Since the airbag that has been inflated and deployed is located between the occupant and the body side portion that bulges into the passenger compartment, the impact applied to the occupant from the side via the body side portion is reduced.

It is predicted that, in the above shown airbag apparatus, the occupant protecting performance will be improved if the occupant is moved inward away from the body side portion before the body side portion bulges into the passenger compartment. In the above described airbag apparatus, although the inflated and deployed airbag can push the occupant further into the passenger compartment, the timing at which the airbag pushes the occupant is after the airbag breaks out of the backrest and is deployed to a certain degree. Thus, this type of airbag is still susceptible to improvement in terms of the occupant protecting performance.

SUMMARY OF THE INVENTION

Accordingly, it is an objective of the present invention to provide an airbag apparatus that has an improved occupant protecting performance against impact from a side of a vehicle.

To achieve the foregoing objective and in accordance with one aspect of the present invention, an airbag apparatus comprising an airbag module installed in a backrest of a vehicle seat is disclosed. The backrest has a side support on each side with respect to the direction of the vehicle width. Each side support has a base portion located at a position closer to a center of the backrest with respect to the direction of the vehicle width. The airbag module is installed in a side portion of the back rest that faces the exterior of the vehicle. The airbag module includes a gas generator that generates gas in response to impact from a side of the vehicle, and an airbag that is inflated and deployed by the gas generated by the gas generator. The airbag module is installed in the backrest in such a manner that, when the airbag is inflated and deployed, the airbag pushes the base portion of the side support on the exterior side obliquely forward and further into the passenger compartment.

DESCRIPTION OF THE PREFERRED EMBODIMENTS

One embodiment of the present invention will now be described with reference to FIGS. 1 to 8.

Figure 1:
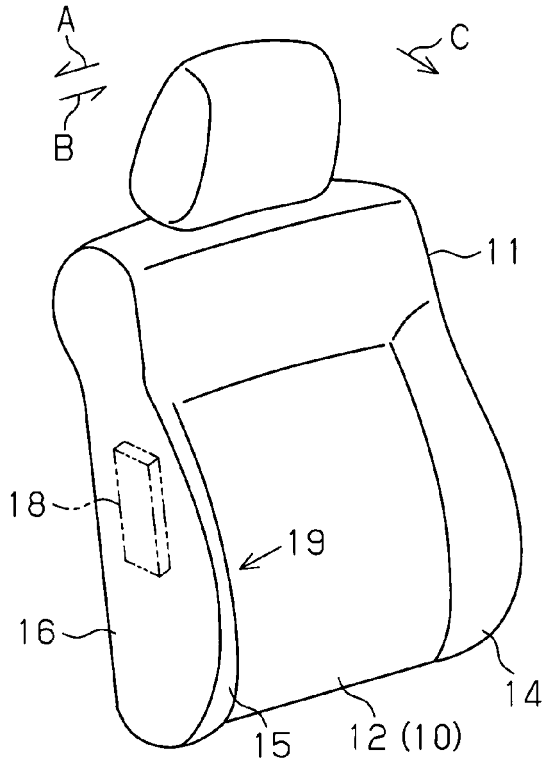
FIG. 1 is a perspective view illustrating a backrest of a vehicle seat in which an airbag apparatus according to one embodiment of the present invention is installed.
Figure 2:
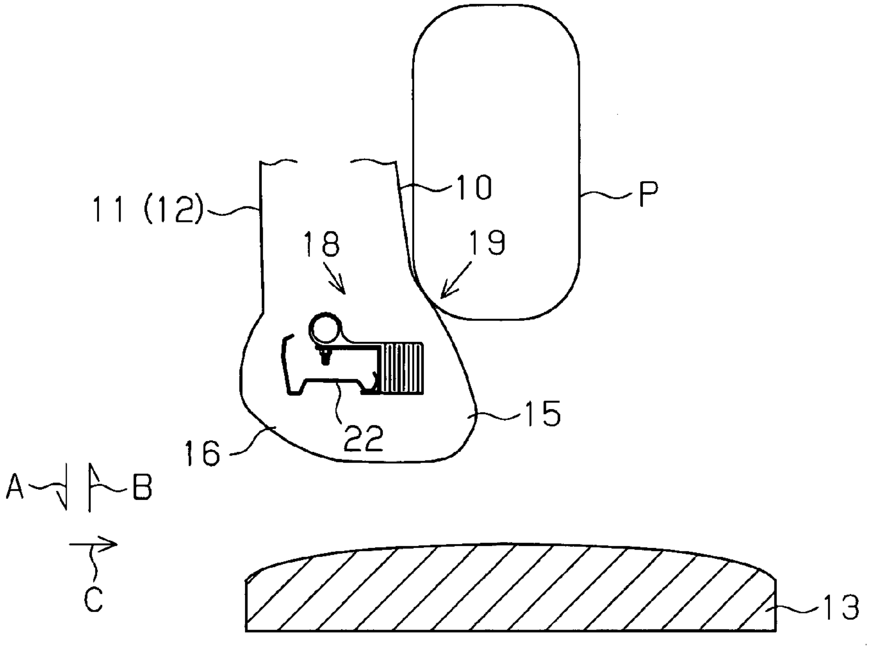
FIG. 2 is a schematic plan view for explaining the positional relationship between the backrest of FIG. 1 and a vehicle body side portion.

FIG. 1 illustrates a backrest 12 of a vehicle seat 11, in which an airbag apparatus according to the present embodiment is installed. FIG. 2 shows the positional relationship between the backrest 12 a body side portion 13 of a vehicle, such as a door. The backrest 12 has side portions at both ends along the width of the vehicle. One side portion 16 is located close to the body side portion 13.

In FIGS. 1 and 2, the direction indicated by arrow A represents a direction from the passenger compartment toward the outside of the vehicle, while the direction indicated by arrow B represents a direction from the outside of the vehicle toward the passenger compartment. The directions indicated by arrows A and B coincide with the directions along the vehicle width. In FIGS. 1 and 2, the direction indicated by arrow C represents the advancing direction of the vehicle, or the forward direction of the vehicle. Arrows A, B and C in other drawings are also oriented in the forward direction.

As shown in FIGS. 1 and 2, the backrest 12 has side supports 14, 15, which project forward, at the sides. The side supports 14, 15 supports an occupant P seated on the vehicle seat 11 in such a manner as to limit the movement of the occupant in the direction of the vehicle width. The side supports 14, 15 project further forward than a middle portion 10, which is a portion of the backrest 12 between the sides.

The internal structure of the side portion 16 on the exterior side of the backrest 12 will now be described.

Figure 3:
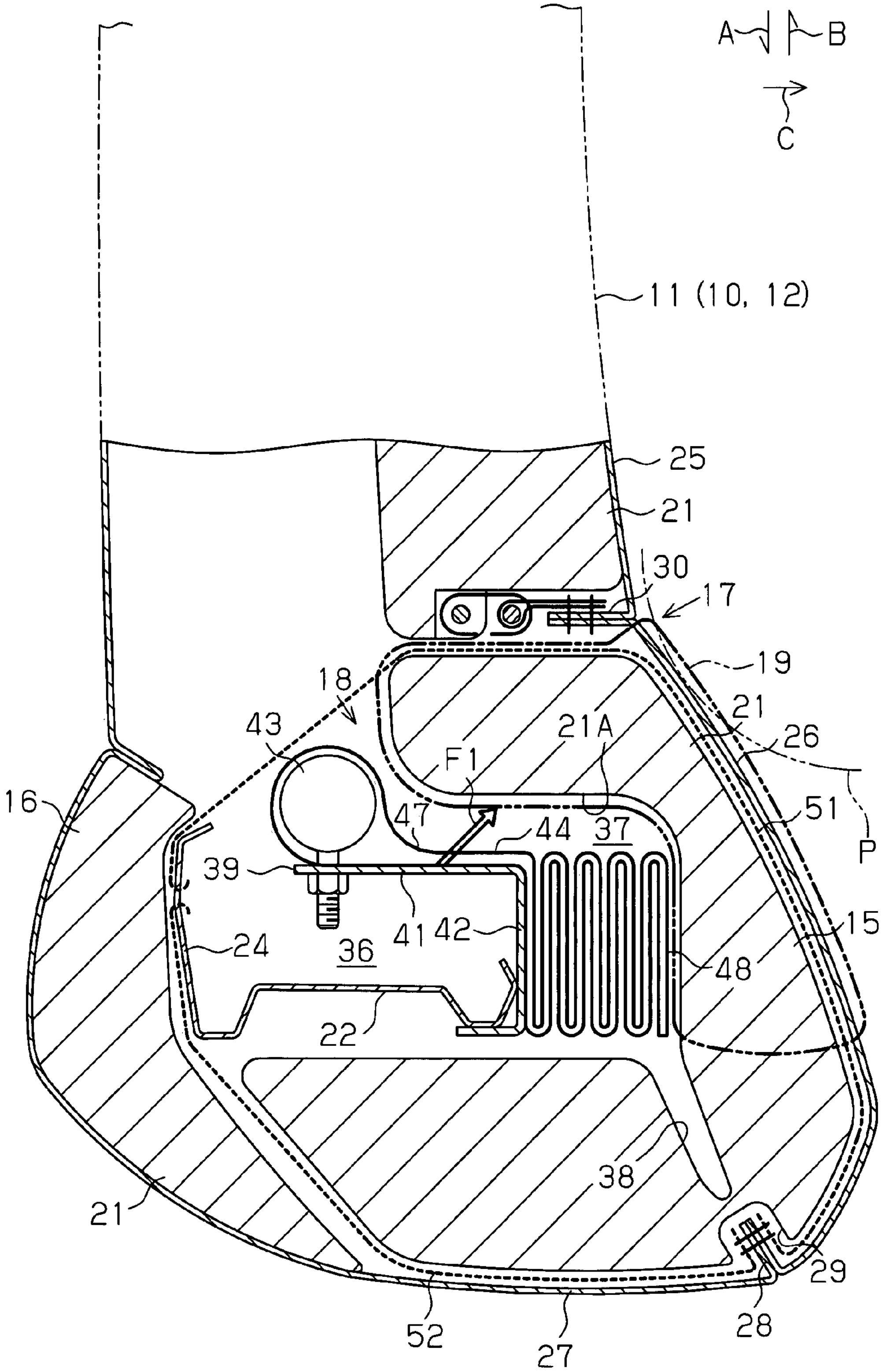
FIG. 3 is a cross-sectional plan view partially illustrating the interior of a side portion on an exterior side of the backrest of FIG. 1.
Figure 4:
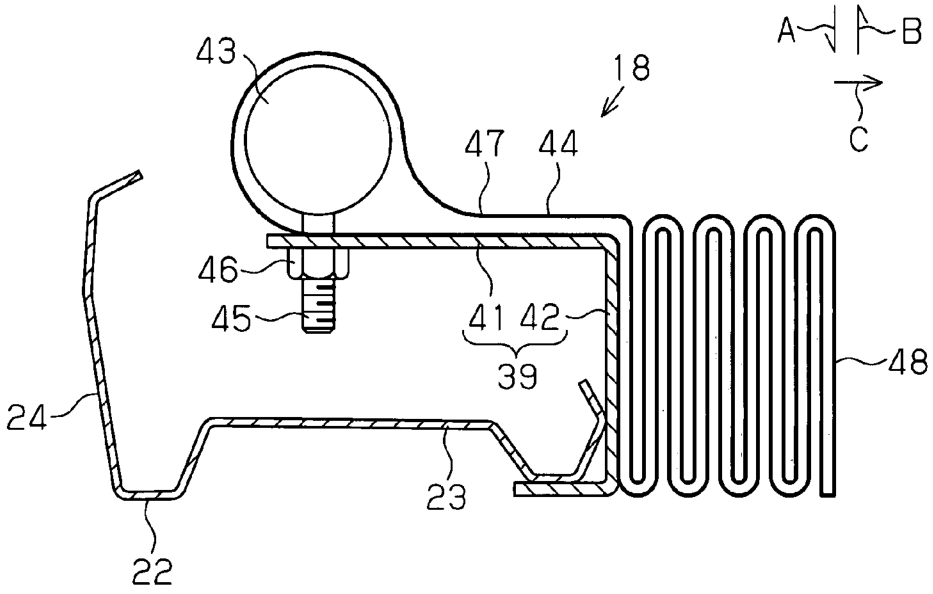
FIG. 4 is a cross-sectional plan view illustrating the side frame and the airbag module shown in FIG. 3.

As shown in FIG. 3, the backrest 12 includes a seat frame and a seat pad 21 provided about the seat frame. The seat pad 21 is made of an elastic material such as urethane foam. A part of the seat frame that is located in the side support 15 will be referred to as a side frame 22. The side frame 22 is formed by bending a metal plate. As shown in FIG. 4, the side frame 22 includes a side wall portion 23, which extends along the front-rear direction of the vehicle, and a rear wall portion 24, which is located at the rear end of the side wall portion 23 and bent inward into the passenger compartment.

As shown in FIG. 3, the seat pad 21 is covered by cover sheets 25 to 27. The cover sheet 26 and the cover sheet 27 overlap each other on a front portion of the side of the side support 15 and are sewn together. The sewn portion 28 is accommodated in a groove 29 formed in the seat pad 21. Since the sewn portion 28 has a less strength than non-sewn portions of the cover sheets 26, 27, the sewn portion 28 form a part of a breakable portion, which is broken by an airbag 44, which will be described blow.

Figure 5:
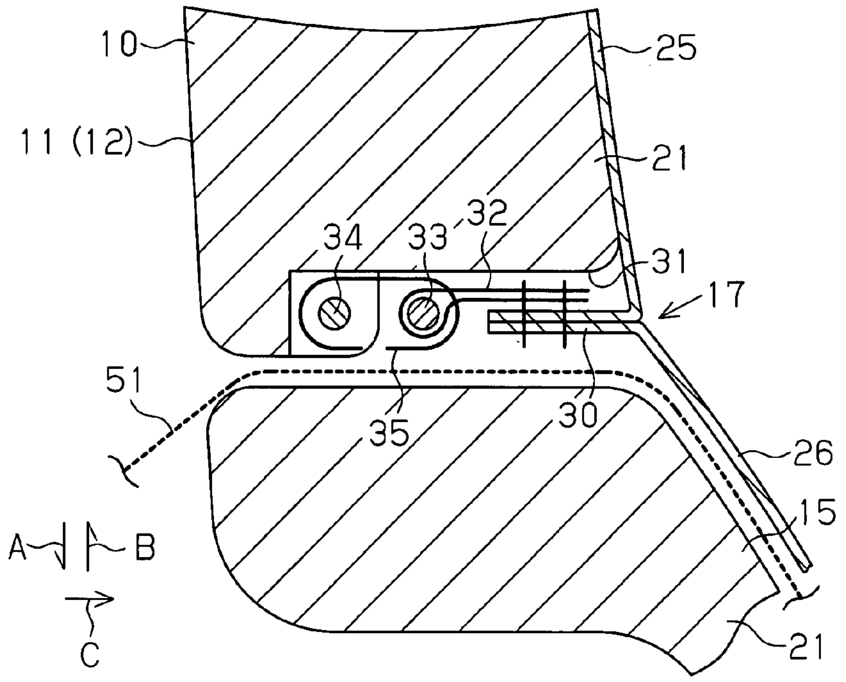
FIG. 5 is a cross-sectional plan view illustrating a boundary portion and its surroundings shown in FIG. 3.

As shown in FIG. 5, at a portion that corresponds to a boundary 17 between the middle portion and the support 15, the cover sheet 25 and the cover sheet 26 are folded outward and sewn to each other. The sewn portion 30 is accommodated in a groove 31 formed in the front portion of the seat pad 21 while being pulled rearward. To maintain the state in which the sewn portion 30 is pulled rearward, a wire receiving portion 32 made of, for example, fabric is sewn to the sewn portion 30. A vertically extending first wire 33 is received by the wire receiving portion 32. In the groove 31, a vertically extending second wire 34 is provided rearward of the first wire 33. The second wire 34 is fixed to the seat pad 21. The first wire 33 and the second wire 34 are coupled to each other by rings 35, which are arranged at several positions along the vertical direction. The rings 35 are preferably made of metal. Although the rings 35 are crimped to the wires 33, 34, FIG. 5 shows a state before the rings 35 are crimped to the wires 33, 34.

As shown in FIG. 3, the seat pad 21 has an accommodation space about the side frame 22. An airbag module 18, which forms a main part of the airbag apparatus, is accommodated in the accommodation space. The accommodation space includes a side accommodation space 36, which is inward of the side frame 22 in the passenger compartment, and a front accommodation space 37, which is located forward of the side frame 22. The front accommodation space 37 communicates with the side accommodation space 36.

The front accommodation space 37 and components accommodated in the front accommodation space 37, such as the airbag 44, can reduce the comfort of the vehicle seat 11 and the backrest 12. This is because the configuration of the present invention has less resiliency than a case in which the side portion 16 of the backrest 12 is embedded in the seat pad 21. Thus, the volume of the front accommodation space 37 is limited to a value that does not significantly reduce the comfort. As for the side accommodation space 36, few limitations on the volume are applied.

From a corner of the front accommodation space 37 on the exterior side, a slit 38 extends toward the sewn portion 28 of the cover sheets 26 and 27. A portion of the seat pad 21 between the slit 38 and the sewn portion 28 is thin, and forms, together with the sewn portion 28, the breakable portion.

As shown in FIGS. 3 and 4, a bracket 39 is attached to the side frame 22. The bracket 39 includes a side plate portion 41 and a front plate portion 42. The side plate portion 41 extends along the front-rear direction at a position spaced from the side wall portion 23 of the side frame 22 into the passenger compartment by a predetermined distance. The front plate portion 42 extends toward the exterior side from the front end of the side plate portion 41. The bracket 39 is made of a plate having a high rigidity, such as a metal plate. The front plate portion 42 of the bracket 39 is fixed to the side wall portion 23 of the side frame 22 with a fastening member (not shown). The bracket 39 may be integrally formed with the side frame 22. Alternatively, the side frame 22 itself may form the bracket 39.

The airbag module 18 includes an inflator 43 serving as a gas generator and the airbag 44, which covers the inflator 43. The inflator 43 accommodates a gas generating agent (not shown). The inflator 43 generates gas by means of combustion reaction of the gas generating agent. The inflator 43 is located on the interior side of the side plate portion 41 of the bracket 39, and is fixed to the rear end portion of the side plate portion 41 with fastening components including a bolt 45 and a nut 46. The inflator 43 may be replaced by other types of inflator. For example, an inflator may be used that has a compressed gas cylinder filled with high pressure gas. In this case, a wall of the gas cylinder is broken with explosive to discharge the high pressure gas into the airbag 44.

The airbag 44 is formed by, for example, sewing the peripheral portions of a pair of fabric sheets. The airbag 44 includes a first airbag portion 47, which is inflated and deployed obliquely forward and further into the passenger compartment, and a second airbag portion 48, which is inflated and deployed forward. The first airbag portion 47 is provided non-folded in the side accommodation space 36 at a position forward of the inflator 43 and close to the interior side of the side plate portion 41. The second airbag portion 48 is provided folded in the front accommodation space 37, at a position forward of the first airbag portion 47 and rearward of the front plate portion 42.

The above described inflator 43 and airbag 44 are not accommodated in a case made of, for example, resin, but are wrapped by a flexible bag (not shown).

In this manner, the airbag module 18 installed in the side portion 16 on the exterior side of the backrest 12 is capable of pushing a base portion 19 of the side support 15 obliquely forward and further into the passenger compartment when the airbag 44 is inflated and deployed. As shown alternate long and two short dashes lines in FIG. 3, the base portion 19 is a part of the side support 15 that is pushed by the airbag 44, and located between the airbag module 18 and the occupant P. The base portion 19 is a part of the side support 15 that is close to the center of the backrest 12 in the direction of the vehicle width. More specifically, the base portion 19 is a part between the boundary 17 and the second airbag portion 48 with respect to the direction of the vehicle width. With respect to the front-rear direction, the base portion 19 is a part forward of the front surface of the middle portion 10.

In the backrest 12, no hard objects that hinder inflation and deployment of the airbag 44 exist between the airbag module 18 and the base portion 19. Such hard objects include, for example, a reinforcing member that limits inflation and deployment of the airbag 44. A typical side airbag apparatus has a reinforcing member for guiding an airbag such that the airbag accommodated in a side portion of a backrest is reliably inflated and deployed obliquely forward and toward the exterior. However, in this embodiment, no reinforcing members are provided. The seat pad 21 and the bag that wraps the airbag module 18 are easily deformed, and therefore are not hard objects.

The region in which no hard objects are present is preferably large from the view point of permitting inflation and deployment of the airbag 44. The region between the boundary 17 and the sewn portion 28 is most preferable as such a region in which no hard objects are present. Even in a typical side airbag apparatus, a region on the exterior side of the second airbag portion 48 is a region in which no hard objects that hinder inflation and deployment of an airbag are present. The region in which no hard objects are present is larger than that in a typical side airbag apparatus. Further, the base portion 19 is located inward of a region of a typical side airbag apparatus in which no hard objects are present. In an initial stage of inflation and deployment of the airbag 44, the airbag 44 presses the base portion 19.

The airbag apparatus includes, besides the airbag module 18 described above, an impact sensor and a controller, which are not shown. The impact sensor is configured by, for example, an acceleration sensor, and is provided in the body side portion 13 of the vehicle. The impact sensor detects impact applied from the side to the body side portion 13. When the impact detected by the impact sensor is greater than or equal to a predetermined value, the controller activates the inflator 43. As a result, the inflator 43 supplies high pressure gas to the airbag 44, and the pressure of the gas inflates and deploys the airbag 44.

Further, between the cover sheets 26, 27 and the seat pad 21, two reinforcing fabric sheets 51, 52 are provided to surround the side frame 22, the bracket 39, and the airbag module 18. The reinforcing fabric sheets 51, 52 are formed of a material having a small stretchability. One end of each reinforcing fabric sheet 51, 52 is sewn to the cover sheets 26, 27 at the sewn portion 28. The other end of each reinforcing fabric sheet 51, 52 is engaged with the rear wall portion 24 of the side frame 22. The reinforcing fabric sheets 51, 52 prevent the airbag 44 from being inflated in directions other than a predetermined deployment direction in an initial stage of inflation and deployment of the airbag 44. The reinforcing fabric sheets 51, 52 suppress deformation of the seat pad 21 and extension of the cover sheets 26, 27, thereby promoting the breakage at the breakable portion.

In the above described airbag apparatus, in a state shown in FIG. 3, when high pressure gas is discharged from the inflator 43 in response to impact from a side of the vehicle, the gas first starts inflating the first airbag portion 47 of the airbag 44. At this time, the side plate portion 41 of the bracket 39, which has a high rigidity, functions as a first pressure sensing portion, and receives the pressure of the gas flowing obliquely rearward and toward the exterior. The side plate portion 41 also generates a reaction force F1 directed obliquely forward and toward the center of passenger compartment. The reaction force F1 allows the first airbag portion 47 to be reliably and rapidly inflated and deployed obliquely forward and further into the passenger compartment, so that the first airbag portion 47 contacts an inner surface 21A of the seat pad 21, which forms the front accommodation space 37. As the inflation progresses, the first airbag portion 47 presses the seat pad 21 obliquely forward and further into the passenger compartment.

Figure 6:
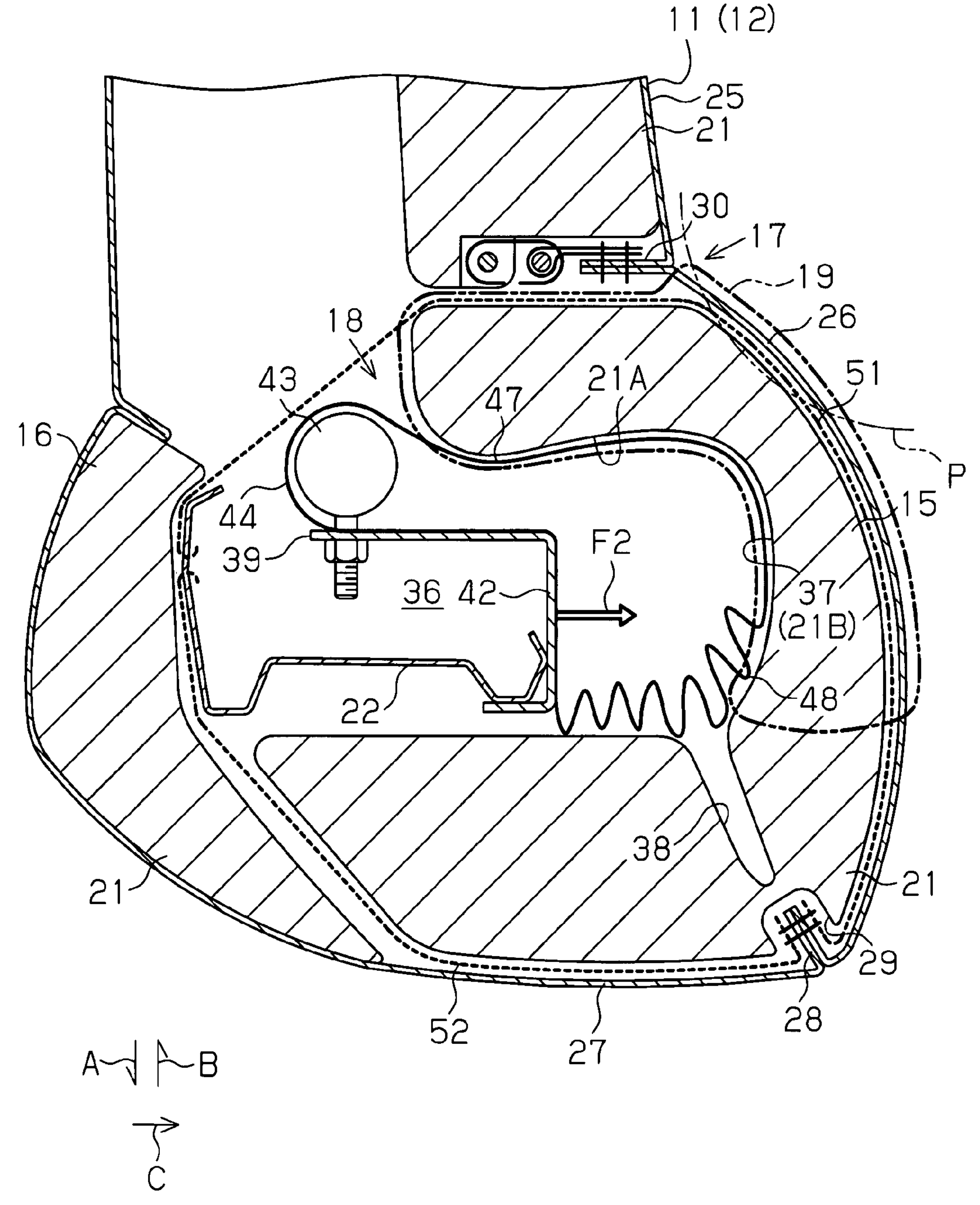
FIG. 6 is a cross-sectional plan view partially illustrating an initial state of inflation of the airbag shown in FIG. 3.

Accordingly, as shown in FIG. 6, the base portion 19 of the side support 15 starts bulging obliquely forward and further into the passenger compartment. The bulged side support 15 pushes the occupant P seated on the vehicle seat 11 and leaning against the backrest 12, thereby moving the occupant P further into the passenger compartment. The direction of the movement is a direction away from the body side portion 13 of the vehicle.

If a hard object exists between the airbag module 18 and the base portion 19 in the backrest 12, the inflation and the deployment of the airbag 44 are hindered by the hard object. As a result, the base portion 19 is unlikely to be pressed obliquely forward and further into the passenger compartment in the initial stage of the inflation of the airbag 44. This reduces the movement of the occupant P further into the passenger compartment by the base portion 19. However, in the present embodiment, no hard objects are present between the airbag module 18 and the base portion 19. Thus, the base portion 19 is reliably pushed obliquely forward and further into the passenger compartment from the initial stage of the inflation and deployment of the airbag 44.

Further, if the first airbag portion 47 is folded, the folded sections hinder inflation and deployment. However, according to the present embodiment, since the first airbag portion 47 is not folded, the first airbag portion 47 is rapidly inflated and deployed.

In the airbag 44, in addition to the first airbag portion 47, the second airbag portion 48 starts being inflated by the high pressure gas discharged from the inflator 43. The pressure of the gas is applied to the front plate portion 42 of the bracket 39 through the second airbag portion 48. At this time, the front plate portion 42, which has a high rigidity, functions as a second pressure sensing portion, and receives the pressure of the gas flowing rearward. The front plate portion 42 also generates a reaction force F2 directed forward. The reaction force F2 allows the second airbag portion 48 to be reliably and rapidly inflated and deployed forward, so that the second airbag portion 48 contacts an inner surface 21B of the seat pad 21, which forms the front accommodating space 37. As the inflation of the second airbag portion 48 progresses, the second airbag portion 48 pushes seat pad 21 forward, and a part of the second airbag portion 48 enters the slit 38. Even after entering the slit 38, the second airbag portion 48 continues being inflated and deployed.

Figure 7:
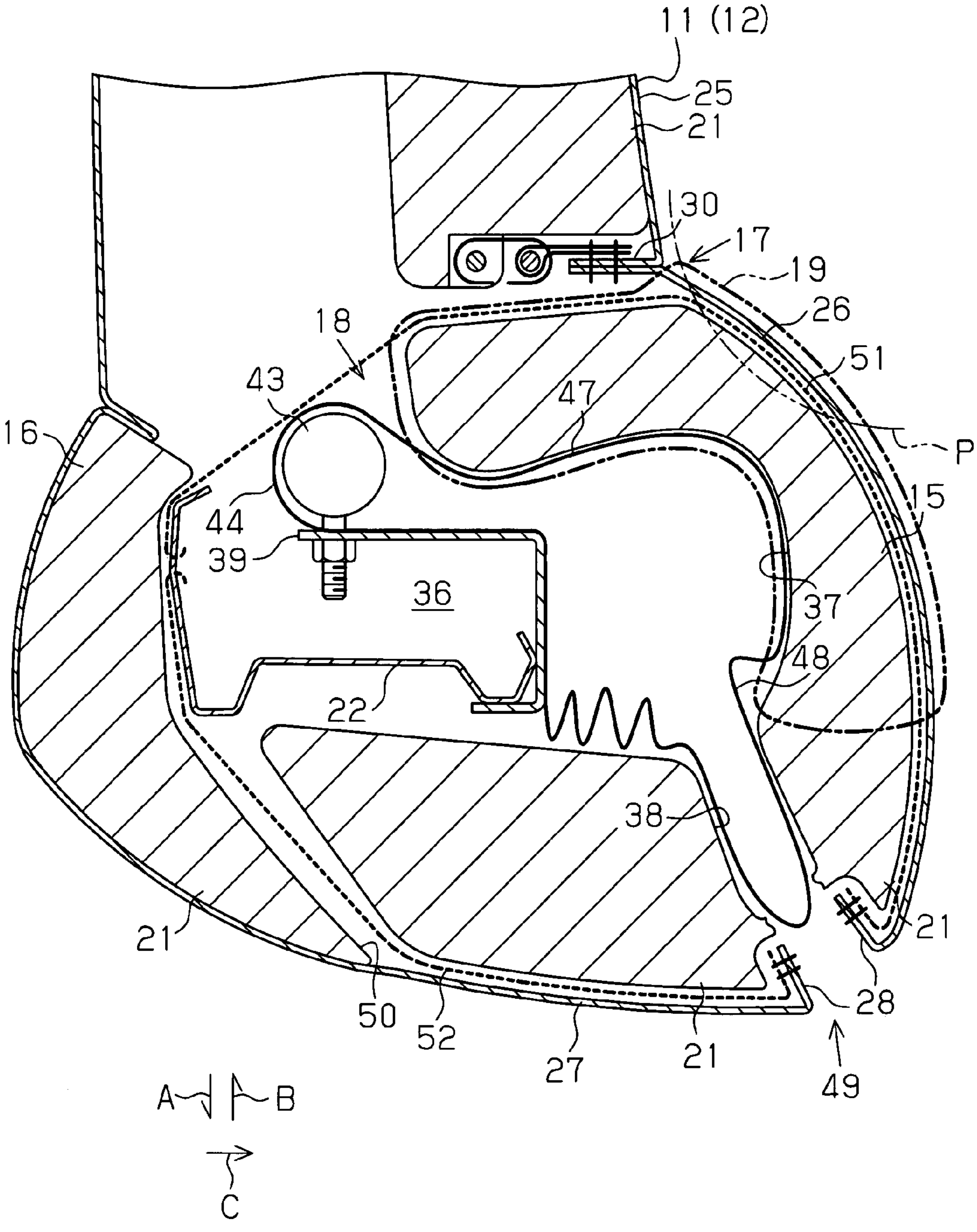
FIG. 7 is a cross-sectional view partially showing a state in which the backrest is broken as the inflation of the airbag shown in FIG. 6 progresses.

Therefore, as the inflation and deployment of the airbag 44, that is, the inflation and deployment the first airbag portion 47 and the second airbag portion 48, progress, the side support 15 is broken at the breakable portion as shown in FIG. 7. That is, a thin portion of the seat pad 21 between the slit 38 and the sewn portion 28 is broken, and the sewn state at the sewn portion 28 is undone, so that an opening 49 is created. As the first airbag portion 47 and the second airbag portion 48 enlarge the opening 49 created by the breakage, the second airbag portion 48 breaks out from the backrest 12 through the opening 49. At this time, a part of the side support 15 that is inward of the opening 49 opens forward while pivoting about the sewn portion 30. A part of the side support 15 that is rearward of the opening 49 opens rearward while pivoting about a notch 50 formed in a side of the seat pad 21.

Figure 8:
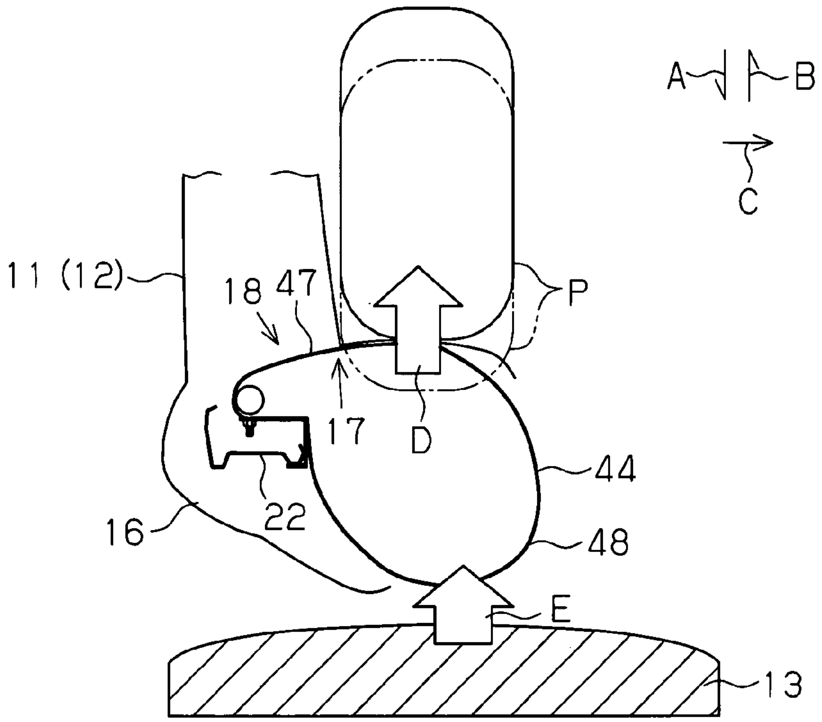
FIG. 8 is a schematic plan view for explaining the positional relationship between the backrest and the body side portion when impact is applied from a side of the vehicle.

Thereafter, the first airbag portion 47 continues being inflated and deployed, and pushes the occupant P further into the passenger compartment as indicated by arrow D in FIG. 8. Alternate long and two short dashes lines in FIG. 8 shows the position of the occupant P before the airbag apparatus is activated.

According to the present embodiment, the occupant P is pushed further into the passenger compartment from the initial stage of the inflation in which the airbag 44 is inflated within the backrest 12. That is, before the airbag 44 breaks out of the backrest 12, the occupant P is moved further into the passenger compartment.

After breaking out through the opening 49, which has been created by the breakage of the sewn portion 28, the second airbag portion 48 is inflated and deployed forward from the backrest 12. Since the airbag 44 that has been inflated and deployed is located between the occupant P, or a wide range from a shoulder to the lumbar, and the body side portion 13, which bulges into the passenger compartment as indicated by arrow E in FIG. 8, the impact applied to the occupant P from a side via the body side portion 13 is reduced. At this time, as described above, the occupant P is pushed by the side support 15 and moved further into the passenger compartment. Accordingly, the impact applied to the occupant P from the body side portion 13 is reduced.

The present embodiment provides the following advantages.

(1) The airbag module 18 is installed in the backrest 12 such that the base portion 19 of the side support 15 that is at the exterior side of the backrest 12 is pressed obliquely forward and further into the passenger compartment when the airbag 44 is inflated and deployed. Therefore, the occupant P is pushed further into the passenger compartment from the initial stage of the inflation in which the airbag 44 is inflated within the backrest 12. Since the occupant P is moved further into the passenger compartment before the inflated the airbag 44 breaks out of the backrest 12, the occupant protecting performance against impact from a side of the vehicle is improved.

(2) In the initial stage of the airbag 44, the occupant P is pushed further into the passenger compartment with the backrest 12 (the seat pad 21) made of elastic material. Therefore, compared to the case in which an airbag directly pushes an occupant P further into the passenger compartment, the impact applied to the occupant P is reduced.

(3) No hard objects that hinder inflation and deployment of the airbag 44 exist between the airbag module 18 and the base portion 19 of the side support 15 in the backrest 12. Thus, from the initial stage of inflation and deployment of the airbag 44, the base portion 19 is reliably pushed obliquely forward and further into the passenger compartment. This ensures the advantage of the above item (1).

(4) The airbag 44 includes the first airbag portion 47, which is inflated and deployed obliquely forward and further into the passenger compartment, and the second airbag portion 48, which is inflated and deployed forward. Thus, in addition to the advantage of the above item (1) obtained through the inflation and deployment of the first airbag portion 47, the inflation and deployment of the second airbag portion 48 reduces impact applied to the occupant P from a side through the body side portion 13. When the second airbag portion 48 is inflated and deployed, the occupant has been moved further into the passenger compartment by the inflation and deployment of the first airbag portion 47. Thus, impact from a side of the vehicle is further effectively reduced by the inflation and deployment of the airbag portions 47, 48.

(5) The side plate portion 41 is located in the backrest 12 and close to the exterior side of the first airbag portion 47, and functions as the first pressure receiving portion. Therefore, the side plate portion 41 receives the pressure of gas through the inflating first airbag portion 47, and inflates and deploys the first airbag portion 47 in a direction of the reaction force F1, which is directed obliquely forward and toward the center of the passenger compartment. Thus, compared to a case in which the first pressure receiving portion is not provided, the first airbag portion 47 is reliably and rapidly inflated and deployed obliquely forward and further into the passenger compartment, so that the base portion 19 of the side support 15 is pushed obliquely forward and further into the passenger compartment.

(6) The first airbag portion 47 is installed in the backrest 12 in a non-folded state. Therefore, the first airbag portion 47 is rapidly inflated and deployed without being influenced by resistance due to folding, so that the occupant P is pushed further into the passenger compartment from an earlier stage.

(7) The front plate portion 42 is located in the backrest 12 and close to the rear end of the second airbag portion 48, and functions as the second pressure receiving portion. Therefore, the front plate portion 42 receives the pressure of gas through the inflating second airbag portion 48, and applies the reaction force F2, which is directed forward, to the second airbag portion 48. Thus, compared to a case in which the front plate portion 42 of the second pressure receiving portion is provided, the second airbag portion 48 is reliably and rapidly inflated and deployed forward.

(8) Conventionally, in view of ensuring the comfort of vehicle seats, providing the relatively large front accommodation space 37 forward of the side frame 22 is not preferable. However, according to the present embodiment, since the second airbag portion 48 is folded, the second airbag portion 48 is accommodated in the accommodation space 37 in a compact state. This allows the front accommodation space 37 to be minimized.

The above embodiments may be modified as follows.

Figure 9:
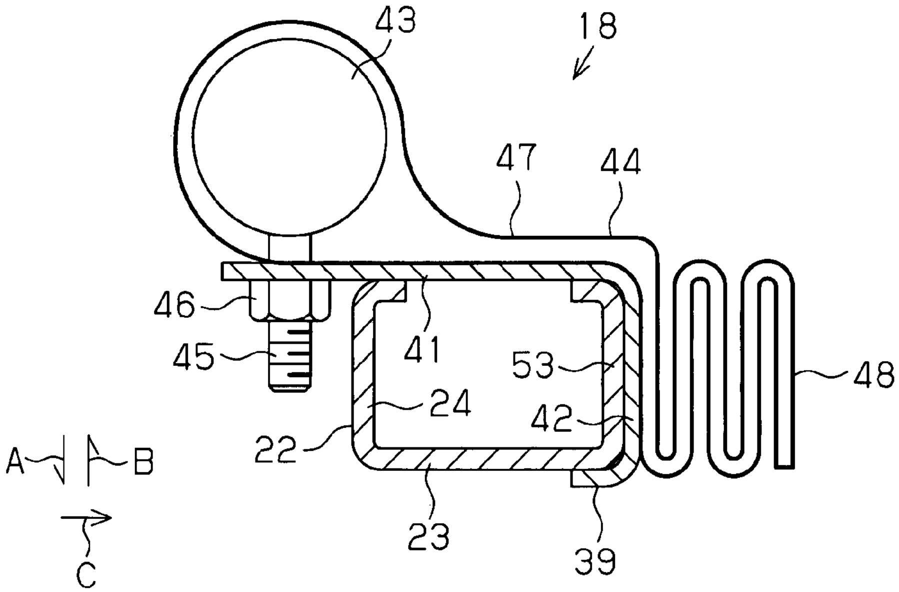
FIG. 9 is a cross-sectional view illustrating of an airbag module attached to a side frame having a different shape.
Figure 10:
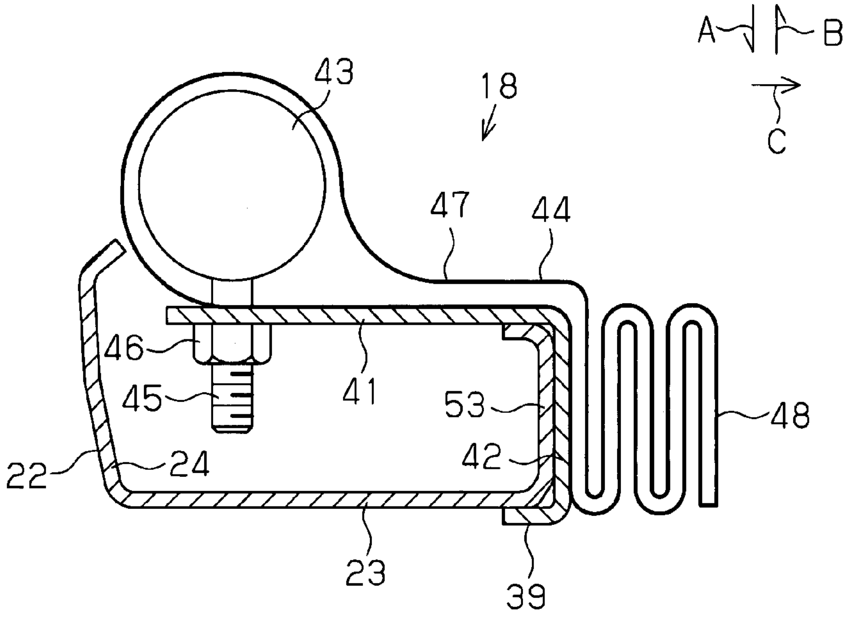
FIG. 10 is a cross-sectional view illustrating an airbag module attached to another side frame having a different shape.
Figure 11:
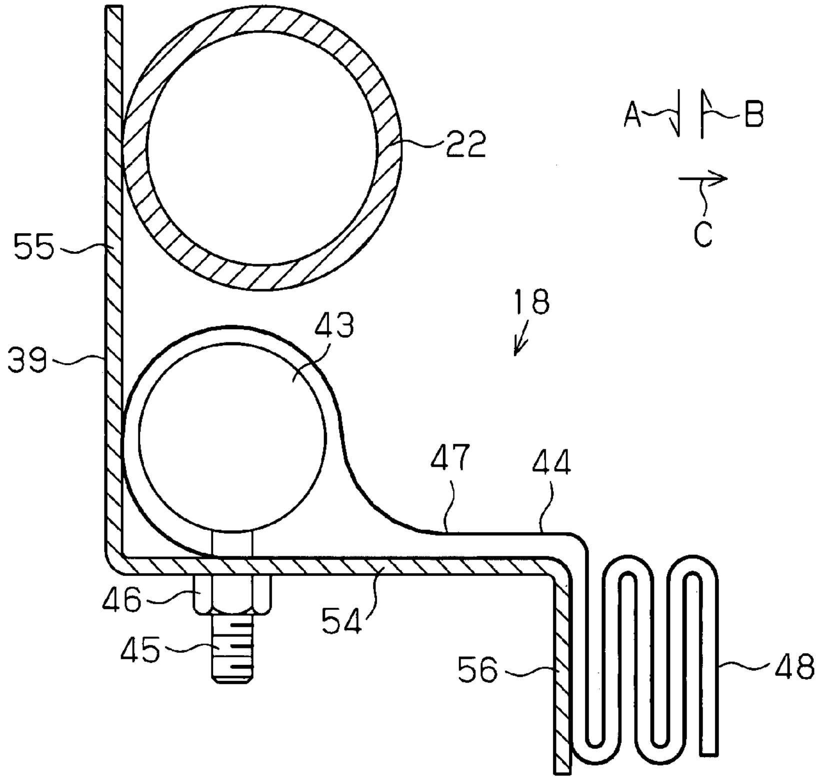
FIG. 11 is a cross-sectional view illustrating an airbag module attached to another side frame having a different shape.

The airbag apparatus according to the present invention may be applied to a vehicle seat that has a side frame of a shape different from that of the side frame 22 in the above illustrated embodiment. FIGS. 9 to 11 each illustrate one example of side frame having a shape different from that of the side frame 22 of the above illustrated embodiment.

Side frames 22A, 22B shown in FIGS. 9 and 10 each include a front wall portion 53 that extends from the front end of a side wall portion 23 toward the center of the passenger compartment. A bracket 39 having the same structure as the above illustrated embodiment is attached to the front wall portion 53.

The side wall portion 23 of the side frame 22B shown in FIG. 10 is longer along the front-rear direction of the vehicle than that of the side frame 22A of FIG. 9. Accordingly, in FIG. 9, the inflator 43 is located rearward of the rear wall portion 24 of the side frame 22A. In contrast, in FIG. 10, the inflator 43 is forward of the rear wall portion 24 of the side frame 22B.

A side frame 22C shown in FIG. 11 is cylindrical. A bracket 39 attached to the side frame 22C has a side plate portion 54 extending in the front-rear direction, a rear plate portion 55 that extends from the rear end of the side plate portion 54 toward the center of the passenger compartment, and a front plate portion 56 that extends from the front end of the side plate portion 54 toward the exterior side. The bracket 39 is fixed to the side frame 22 at the rear plate portion 55. The inflator 43 and the first airbag portion 47 are arranged on the interior side of the side plate portion 54, and the second airbag portion 48 is arranged forward of the front plate portion 56.

Figure 12:
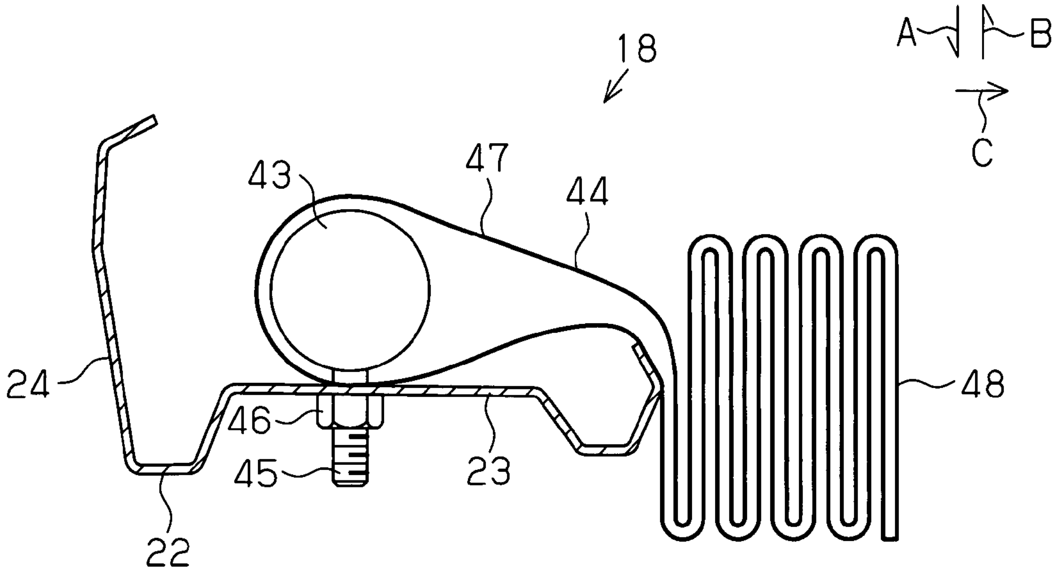
FIG. 12 is a cross-sectional view showing a modification in which an airbag module is directly attached to a side frame.

As shown in FIG. 12, the airbag module 18 may be directly attached to the side frame 22.

When the side wall portion 23 of the side frame 22 has a high rigidity, the side wall portion 23, which is located in the vicinity of the exterior side of the first airbag portion 47, functions as a first pressure receiving portion. The side wall portion 23 receives the pressure of gas through the inflating first airbag portion 47, and applies reaction force that is directed obliquely forward and toward the center of the passenger compartment to the first airbag portion 47.

The front end of the side wall portion 23 having a high rigidity is located in the vicinity of the rear side of the second airbag portion 48, and thus function as a second pressure receiving portion. Therefore, the front end of the side wall portion 23 receives the pressure of gas through the inflating second airbag portion 48, and applies a reaction force that is directed forward to the second airbag portion 48. As a result, without providing the bracket 39, which functions as first and second pressure receiving portions, the same advantages as those of the above illustrated embodiments are obtained.

The second airbag portion 48 of the airbag 44 may be omitted. That is, the airbag 44 may be formed only by the first airbag portion 47. Therefore, the second pressure receiving portion will be unnecessary. In this case, the side support 15 pushes and moves the occupant P further into the passenger compartment. This prevents the occupant P from contacting the body side portion 13 when the body side portion 13 is bulging inward.

The first airbag portion 47 may be installed in the backrest 12 in a folded state. The second airbag portion 48 may be installed in the backrest 12 in a non-folded state.

The present invention may be applied to any airbag apparatus that protects a part of the body of an occupant P other than those shown in the illustrated embodiments.

The invention claimed is:

1. An airbag apparatus comprising an airbag module installed in a backrest of a vehicle seat, the backrest having a side support on each side with respect to a direction of a width of a vehicle, each side support having a base portion located at a position closer to a center of the backrest with respect to the direction of the vehicle width, the airbag module being installed in a side portion of the back rest that faces an exterior of the vehicle, wherein the airbag module includes a gas generator that generates gas in response to impact from a side of the vehicle, and an airbag that is inflated and deployed by the gas generated by the gas generator, wherein the airbag includes a first airbag portion, which is inflated and deployed obliquely forward and toward a center of a passenger compartment in the vehicle, and a second airbag portion, which is inflated and deployed forward of the vehicle, wherein a first pressure receiving portion is provided in the backrest and in a vicinity of an exterior side of the first airbag portion, and wherein the first pressure receiving portion receives, through the first airbag portion, a pressure of gas supplied into the first airbag portion from the gas generator, thereby applying, to the first airbag portion, a reaction force directed obliquely forward and toward the center of the passenger compartment, wherein a second pressure receiving portion is provided in the backrest and in a vicinity of a rear end of the second airbag portion, and wherein the second pressure receiving portion receives, through the second airbag portion, a pressure of gas supplied into the second airbag portion from the gas generator, thereby applying, to the second airbag portion, a reaction force directed forward of the vehicle, wherein the first pressure receiving portion extends along a front-rear direction of the vehicle, wherein the second pressure receiving portion extends along the direction of the width of the vehicle from a front end of the first pressure receiving portion.

2. The airbag apparatus according to claim 1, wherein no hard objects that hinder the inflation and deployment of the airbag are present between the base portion and the airbag.

3. The airbag apparatus according to claim 1, wherein the pressure receiving portion is formed by a side frame located in a side portion of the backrest on the exterior side or by a bracket attached to the side frame.

4. The airbag apparatus according to claim 1, wherein the first pressure receiving portion is formed by a side frame located in a side portion of the backrest on the exterior side or by a bracket attached to the side frame.

5. The airbag apparatus according to claim 1, wherein the first airbag portion is accommodated in a non-folded state in the side portion of the backrest on the exterior side.

6. The airbag apparatus according to claim 1, wherein the second pressure receiving portion is formed by a side frame located in a side portion of the backrest on the exterior side or by a bracket attached to the side frame.

7. The airbag apparatus according to claim 1, wherein the second airbag portion is accommodated in a folded state in the side portion of the backrest on the exterior side.

* * * * *